April 16, 1929. O. B. STRANGE 1,709,287
DEVICE FOR RIPENING MILK FOR CHURNING
Filed June 21, 1927
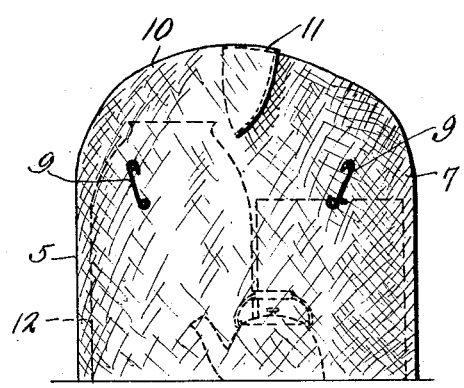
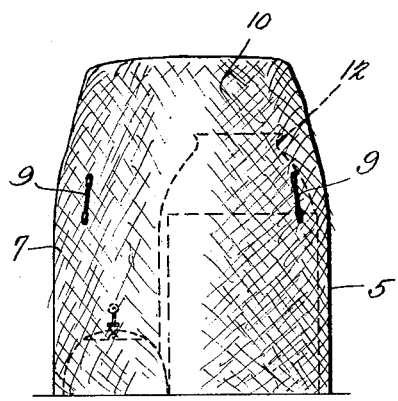
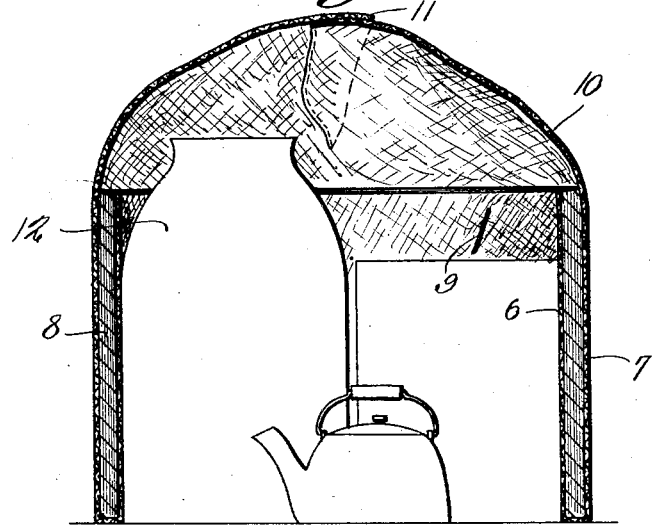
Inventor
O. B. Strange
By C. A. Snow & Co.
Attorneys.

Patented Apr. 16, 1929.

1,709,287

UNITED STATES PATENT OFFICE.

OLIV B. STRANGE, OF TEMPLE, TEXAS.

DEVICE FOR RIPENING MILK FOR CHURNING.

Application filed June 21, 1927. Serial No. 200,429.

The present invention relates to a device especially designed for use in ripening milk to facilitate the churning of the milk.

An important object of the invention is to provide a device of this character whereby the milk will be properly ripened without danger of cooking or rendering the milk unfit for churning.

A still further object of the invention is to provide a device of this character which may be readily and easily positioned for use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view illustrating a device constructed in accordance with the present invention as positioned for use.

Figure 2 is an end elevational view thereof.

Figure 3 is a vertical sectional view through the device.

Referring to the drawing in detail, the device embodying the subject matter of the present invention includes a tubular cover formed preferably of fabric material, the same being indicated generally by the reference character 5.

The body portion has its open end folded inwardly defining an inner wall 6 spaced from the outer wall 7, as clearly shown by Figure 3 thereby providing a space to receive the insulating material 8 which is in the form of paper or the like material.

Pins such as indicated at 9 are provided and extended through the cover and insulating material thereby securing the insulating material between the inner and outer walls of the cover. One end of the cover is closed as at 10, the closure being provided with overlapping flaps 11 to permit a person to reach into the covering and test the milk to determine when the milk has been properly conditioned.

In the use of the device, the milk to be cured is positioned in the churn which is indicated at 12, and a kettle containing hot water positioned adjacent thereto, whereupon the covering is positioned over the churn and kettle, to the end that steam passing from the kettle will act to heat the air under the cover thereby supplying humidity to properly ripen the milk preparatory to churning.

A container in which skimmed milk is contained may also be positioned under the cover and treated at the same time the milk for churning is being treated.

It might be further stated that the covering is formed preferably of fabric material so that it may be readily washed, and folded into a small and compact article when not in use, to facilitate storing.

I claim:

In a device of the character described a fabric cover having an open end and a closed end, the open end permitting the cover to be fitted over receptacles containing milk, one end of the cover being folded inwardly in spaced relation with the main portion of the cover to provide a compartment, sheets of paper secured within the compartment to retain heat within the cover, and the closed end of the cover being slit to permit a person to pass his hand into the cover.

In testimony that I claim the foregoing as my own, I have hereto affixed my signature.

OLIV B. STRANGE.